Feb. 15, 1944. C. B. MOORE 2,341,736
POWER SET FLOW METER
Original Filed Nov. 5, 1937 2 Sheets-Sheet 1

INVENTOR.
COLEMAN B. MOORE
BY C. B. Spangenberg
ATTORNEY

Feb. 15, 1944.  C. B. MOORE  2,341,736
POWER SET FLOW METER
Original Filed Nov. 5, 1937  2 Sheets-Sheet 2
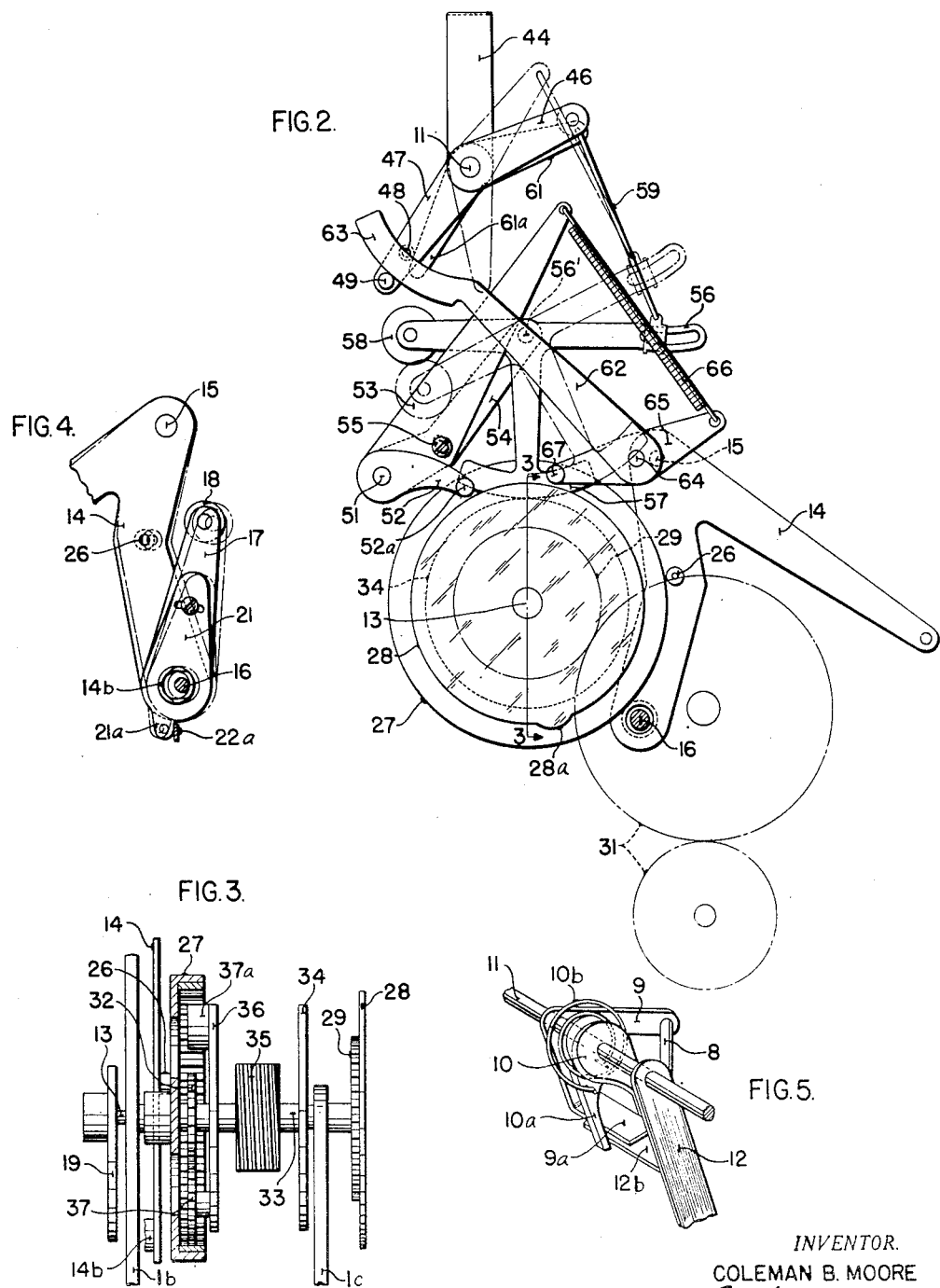
INVENTOR.
COLEMAN B. MOORE
BY C. O. Spangenberg
ATTORNEY Patented Feb. 15, 1944

2,341,736

UNITED STATES PATENT OFFICE 2,341,736

POWER SET FLOWMETER

Coleman B. Moore, Carroll Park, Pa., assignor to The Brown Instrument Company, Philadelphia, Pa., a corporation of Pennsylvania Continuation of application Serial No. 173,007, November 5, 1937. This application March 13, 1941, Serial No. 383,132

11 Claims. (Cl. 73—206)

This invention relates to instrumentalities useful in the measuring and recording of variable conditions, and more particularly to mechanical relay means for effecting adjustments under control of an element deflecting in accordance with the fluctuations of a variable condition such as flow, and is a continuation of my application Serial Number 173,007, filed November 5, 1937.

It is a specific object of my invention to provide a simple, effective and accurate device to integrate the total flow of a fluid in a conduit. In my device the total flow values are integrated to indicate and record the total flow during any desired interval of time. A feeler cam is periodically brought into contact with a deflecting meter element and movement of the cam is utilized to control a brake for the normally moving part of a power driven differential which actuates a counting device to integrate the total flow.

It is a further specific object of this invention to provide an auxiliary power device that is operated in synchronism with and by the differential for setting a recording pen accurately on a chart in accordance with the value of the flow. This recording pen is set intermittently at very small intervals of time so that the record made thereby is practically continuous and very accurate.

It is a particular object of my invention to provide an integrator and pen setting mechanism that take and record frequent readings without placing an objectionable load upon the primary measuring device, which for the attainment of measuring sensitivity and accuracy must necessarily be free from friction and instrument adjustment loads.

The various features of novelty which characterize my invention are pointed out with particularity in the claims annexed to and forming part of this specification. For a better understanding of the invention, however, and the advantages possessed by it, reference should be had to the accompanying drawings and descriptive matter in which I have illustrated and described a preferred embodiment of the invention, in which:

Fig. 2 is a partial view of the device as seen from the back of Fig. 1;

Fig. 3 is a section taken on line 3—3 of Fig. 2; and

Figs. 4 and 5 are detail views of certain parts shown in Fig. 1.

Figure 1:
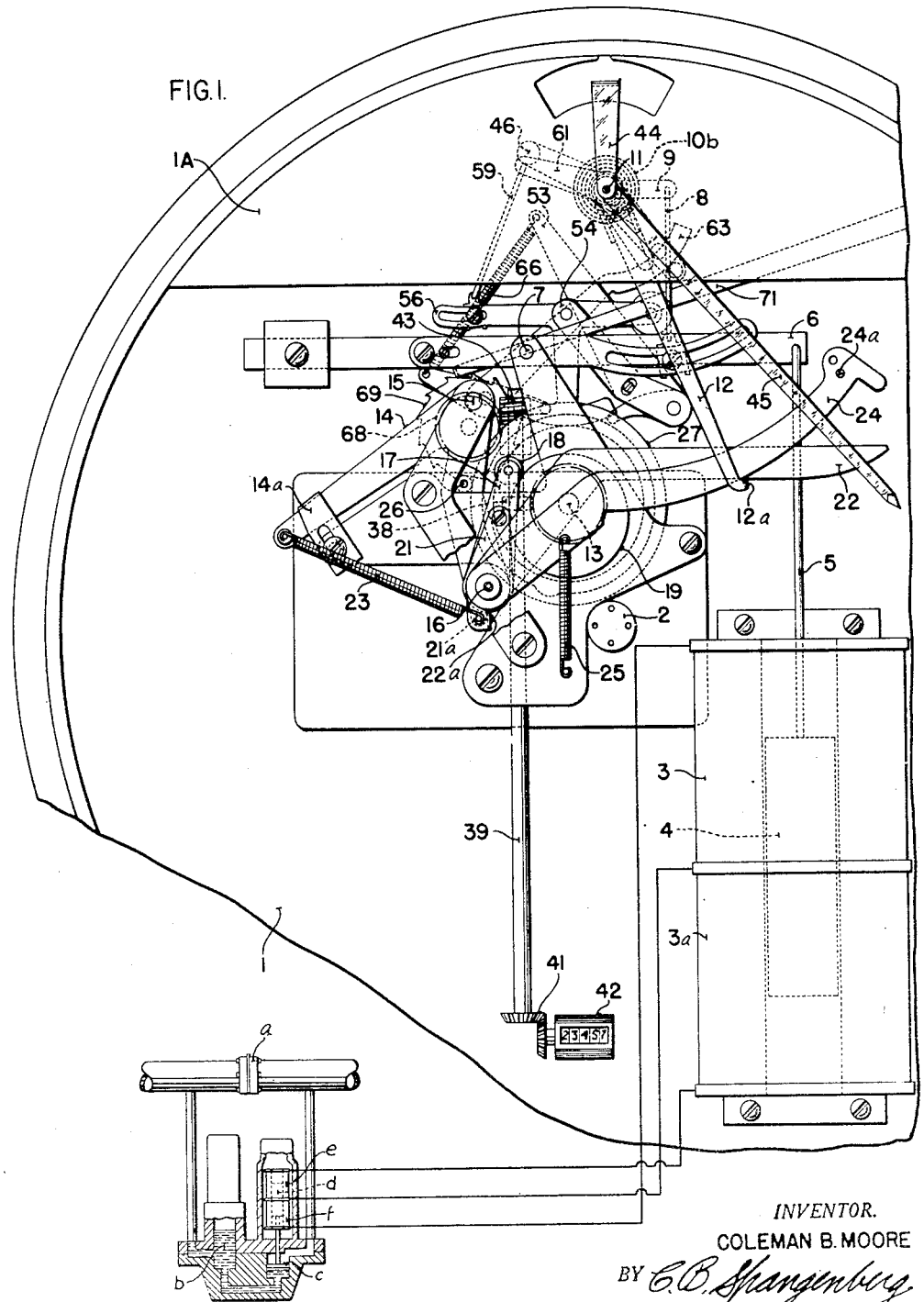
Fig. 1 is a front view of the invention with certain parts broken away to more clearly show the mode of operation.

Although equally useful in connection with mechanical and other electrical types of flow metering systems, my invention is here illustrated as adapted for use in the Brown electric flow meter which is now in wide commercial use and which is disclosed in Harrison Patent 1,743,852, granted January 14, 1930. In this system the differential pressure across an orifice $a$ inserted in the pipe line of a fluid, the rate of flow of which is to be measured, is impressed upon the sealing liquid $b$ of a U-tube manometer the level of the liquid in either leg of the manometer forming a measure of fluid rate of flow. A float $c$ in the liquid in one manometer leg rising and falling with the sealing liquid level carries an armature $d$ adapted to cooperate with inductance coils $e$, $f$ forming the transmitting element of a distant reading system; the distant reading system includes receiving coils 3, 3a electrically connected to the transmitting coils $e$, $f$ and inductively related to a receiver armature 4 which as more fully described in the previously mentioned prior patent is thereby given movements corresponding to the movements imparted to the armature $d$ by the manometer float.

The receiver coils 3, 3a are included in a recorder-integrator instrument of circular form provided with a casing 1 and a chart driving hub which is fixed to a shaft 2 and is rotated at a constant speed by a motor (not shown) making a full revolution in any desired period of time, such as once in twenty-four hours. An upper segment plate 1A cooperates with a lower segment (not shown) to form a closure plate for the front of the instrument casing and to form a bearing plate for a chart which may be mounted on and rotated by the chart hub. The chart hub together with the recorder pens project through the closure plate and the mechanism now to be described is enclosed within the casing and in back of said plate. Armature 4 is connected by a link 5 to a lever 6, pivoted on stud 7, and lever 6 is attached by a short link 8 to a lever 9 which is in turn fastened to and turns shaft 11. Also but loosely journalled on shaft 11 is an arm 12 having formed at its lower end a turned in edge 12a. A resilient connection between lever 9 and arm 12 is provided as is best shown in Fig. 5. The lever 9 is angular in shape and has a bent in edge 9a that is parallel to and slightly spaced from a short arm 12b that is fastened to arm 12. Loosely mounted on the shaft 11 between lever 9 and arm 12 are two fingers 10 and 10a whose lower ends are in engagement with the edges of arms 9a and 12b. These fingers are biased toward each other by spiral spring 10b which has an end fastened to each of members 10 and 10a. Any movement of lever 9 relative to arm 12 is therefore opposed by the spring 10b, but if such relative movement is necessary the spring will give to permit it. It will therefore be seen that for every variation in the flow there will be a variation in the position of the armature 4 and a corresponding variation in the position of the arm 12 when the latter is free to follow the movement of lever 9.

Journaled for rotation in the casing and driven by the same motor that drives shaft 2 is another shaft 13. The shaft 2 is driven at a slow speed, as for example, one revolution in twenty-four hours, but the shaft 13 is driven much faster, one revolution, for example, every six seconds. Shaft 13 having cams 19 and 28 fixed thereto provides the motive power for a differential mechanism by which a recorder arm 45 is periodically driven under power in one direction or the other as necessary to move the pen arm into a position corresponding to the position of lever 9, and by which a counter 42 is driven to continuously integrate the flow.

The differential mechanism referred to operates under power a final pen adjusting element 61 pivoted loosely on shaft 11 and having an arm 61a, which is periodically moved into an angular position about the axis of shaft 11 depending upon the then rate value of the flow. Arm 61a is adapted to be engaged by a pin 48 which is carried by an arm 47 fastened to a yoke member 44 the forwardly projecting leg of which carries the pen arm 45. A counterweight arm 46 is also attached to yoke 44 whereby the counterclockwise bias of the latter (Fig. 2) is partially balanced, sufficient counterclockwise bias remaining to continuously urge arm 47 and pin 48 toward engagement with arm 61a. A second pin 49 carried by arm 47 is adapted to be periodically engaged by a brake member 63 and disengaged to permit pin 48 to turn counterclockwise into engagement with arm 61a when the final position of the latter terminates before engaging pin 48.

When the power positioning stroke of arm 61a results in engagement of pin 48 before brake 63 is released, the arm 47 is moved against the action of the brake, sufficient force being applied to member 61 for this purpose. Brake 63 is carried by an arm 62 that is attached to a pivoted shaft 64. Also attached to the shaft is a lever 65 which is urged counterclockwise by spring 66. The brake 62 is released once in each revolution of shaft 13 by engagement of cam projection 28a of cam 28 with a roller 67 of the lever 65.

The means by which the member 61 is periodically adjusted to a position corresponding to the existing flow value includes a T-shaped member 56 pivoted at 56' to a lever 54 and connected by a link 59 to the member 61. Member 56 is biased by weight 58 to turn counterclockwise into an initial position shown in dotted lines as seen in Fig. 2 and is periodically bodily moved toward and away from a position in which the lower edge of its arcuate arm 57 engages the edge of a disc 34. Disc 34 is fixed to a sleeve 33 which is mounted for rotation about shaft 13, and is given regular periodical movements in the counterclockwise direction by the differential to be described, each such movement proportional in angular extent to the then flow rate value. The movements of disc 34 occur after engagement by the edge of arm 57 so that arm 56 is rotated from the said initial position to a position dependent upon the extent of movement of disc 34 and accordingly upon the rate of flow value, and the position of member 56 is transmitted to member 61 as above described. The member 56 is permitted to return to its initial position once in each rotation of shaft 13 by engagement of cam projection 28a with a roller 52a carried by arm 52 which is attached to an arm 53, the latter being connected by screw 55 to the previously mentioned arm 54 to which arm 56 is pivoted. The compound lever comprising arms 52, 53, 54 is fixedly pivoted at 51.

The sleeve 33 also carries a worm 35 engaging a worm wheel 38 and the latter is attached to a shaft 39 which is connected through bevel gearing 41 to a counter 42. The counter 42 is thus rotated together with disc 34 at regular intervals and for portions of time in each interval dependent upon the rate of flow value at the time so that the counter 42 serves as a continuous integrator of the total flow over a period.

The differential mechanism for actuating the sleeve 33 and disc 34 comprises a gear 32 fixed to the continuously rotating shaft 13 and means by which the gear is effectively coupled to sleeve 33 for a period in each cycle of operation under control of the above mentioned deflecting arm 12 and dependent on the rate of flow value at the beginning of said cycle. The differential mechanism is best seen in Fig. 3, in which the shaft 13 extends through and is journaled for rotation in the frame members 1b and 1c and has mounted for rotation on its internal gear 27. Gear 32 is fixed to shaft 13 together with a driving gear 29 which is driven by the gear train 31 from the motor (not shown) to drive shaft 13. Sleeve 33 is freely rotatable on shaft 13 and has attached to it the disc 34, worm 35 and a plate 36 upon which is mounted for rotation a small gear 37 that is in mesh with gears 27 and 32. A counterweight 37a is attached to the upper end of plate 36.

Gears 32, 37 and 27 form a planetary differential, the driving gear of which is the constantly rotating gear 32. As gear 32 rotates it rotates gear 37, but since 37 is connected with sleeve 33 and its associated parts the load is great enough so that the sleeve does not normally rotate, and internal gear 27 is rotated freely around shaft 13. When, however, a brake pin 26 contacts with the outer surface of gear 27, as later described, the load on gear 27 is greater than that on gear 37 so the differential, taking the course of least resistance, drives the planetary gear 37 causing it to walk around the inside of gear 27 and thereby rotate plate 36, sleeve 33 and worm 35 to actuate the counter 42 from worm wheel 38, shaft 39 and gears 41. Worm 35 and disc 34 rotate as long as pin 26 stays in contact with gear 27 so it will be seen that those members will be rotated through an angular distance proportional to the position of arm 12 and the flow being measured, if pin 26 is caused to engage gear 27 for an appropriate period.

The control of the braking action of pin 26 which is carried by bell crank 14, is effected through mechanism now to be described through which the member 12 governs the oscillation of bell crank 14 toward and away from the position in which its pin 26 engages gear 27. Member 12 is provided with a projection 12a adapted to be engaged by a braking member 24 and by an integrator cam 22, both of which are pivoted at 16. Integrating cam 22 is biased in a clockwise direction (Fig. 1) into engagement with projection 12a by a spring 23, the outer end of the spring being attached to the left hand arm of bell crank 14. The member 22 is periodically moved out of engagement with projection 12a against the action of spring 23 by the action of a lever 17 which is movable around a floating journal sleeve 14b (Fig. 4), and has at its outer end a roller 18 bearing on the surface of the cam 19 which is fastened to shaft 13 for rotation therewith. Also pivoted on the journal 14b is a lever 21 which is adjustably secured to the lever 17 by a screw as shown and has on its lower end a projection 21a. The lower part of integrating cam 22 to which the spring is fastened is formed with a turned in edge 22a which is adapted to be contacted by a projection 21a to turn the integrating cam 22 in a counterclockwise direction when roller 18 is acted on by cam 19. The brake member 24 is provided with a pin 24a on its outer end which extends back into the path of movement of integrating cam 22, and the brake member is acted on by spring 25 which tends to pull it clockwise into contact with edge 12a of the arm 12, but is prevented from such contact when in the counterclockwise movement of cam 22, the latter engages pin 24a turning the brake counterclockwise and releasing member 12.

The journal 14b is carried by the bell crank 14 which is mounted for pivotal movement around stud 15 and the journal, being hollow, loosely surrounds shaft 16 (see Fig. 4). A member 14a, adjustably mounted on the instrument frame, serves to guide the bell crank in its movement and the bell crank is biased counterclockwise about pivot 15 by spring 23.

As the cam 19 rotates clockwise from the position shown in Fig. 1 it acts to move lever 17 in a counterclockwise direction thereby forcing projection 21a into contact with projection 22a to lift the integrating cam 22 from the edge 12a. At this time the pivots will be related as shown in Fig. 4 in which bell crank 14 is in its furthermost position in the clockwise direction, the inner surface of the journal 14b abutting the right-hand side of pin 16. This results from the fact that the normal counterclockwise bias of bell crank 14 is overcome by the gravitational bias of cam 22 in the clockwise direction as lever 17 tends to pivot about 22a until prevented by engagement of members 14b and 16 after which the counterclockwise movement of cam 22 begins. During the lifting movement of the integrating cam 22 the pin 24a is contacted and brake 24 is also lifted out of contact with edge 12a, thereby freeing the arm 12 from any restraint. The arm 12 is then permitted to assume any position around its pivot 11 that it may in accordance with the position of lever 6 and the then value of the flow.

Continued rotation of cam 19 will let lever 17 move in a clockwise direction thereby permitting brake member 24 and integrating cam 22 to descend under the influence of their respective springs and gravitational biases with the pivots still in the relative positions of Fig. 4. Thereafter the lower edge of brake 24 will contact edge 12a to lock the arm 12 in its then position and hold it in place as integrating cam 22 subsequently descends into contact with the edge 12a of arm 12. When the gravitational bias of cam 22 in the counterclockwise direction is thus removed, lever 17 will pivot about projection 22a as bell crank 14 turns counterclockwise under its gravitational bias. Upon continued rotation of cam 19, the lever 17 is permitted further movement clockwise; the engagement of projections 21a and 22a will be broken. The counterclockwise movement of bell crank 14 is terminated in the dotted line position of Fig. 4 when the brake pin 26 mounted on the right-hand arm thereof engages the surface of the gear 27.

The brake pin 26 stays in contact with gear 27 until cam 19 again starts to move lever 17 counterclockwise so that projection 21a will be brought into engagement with projection 22a. Continued movement of lever 17 will cause projection 21a to act as a fulcrum point to move bell-crank 14 clockwise until the inner surface of the journal 14b contacts shaft 16 as shown in Fig. 4. Since the bell-crank can now move no further the lever 22 will again be lifted by projection 21a as above described. When the bell-crank 14 moves in its clockwise direction brake pin 26 will be lifted from the surface of gear 27. The swinging movement of the bell-crank and its pin 26 is very small so that the pin 26 is brought into contact with the surface of gear 27 at practically the same instant that integrating cam 22 contacts edge 12a, and the integrating cam starts its upward movement at practically the same instant that pin 26 is moved away from the surface of the gear. Thus it will be seen that brake pin 26 and gear 27 are in contact an amount of time that is dependent upon the position of arm 12 as measured by the integrating cam 22.

A pen-setting operation occurs at the same time that the integrating is being performed since the driving worm 35 for the integration and the driving disc 34 for the pen are both connected for rotation with sleeve 33. The timing of cams 19 and 28 is such that just as cam 19 has reached a position in which it will start to let lever 17 and integrating cam 22 move in a clockwise direction the raised portion 28a of cam 28, rotating in a counter-clockwise direction in Fig. 2, will move under pin 52a of lever 52 thus moving the lever counterclockwise. Since levers 53 and 54 are mounted to move with lever 52 the T-shaped member 56 will be raised out of contact with disc 34 and will be moved by its gravity bias in a counter-clockwise direction until weight 58 contacts lever 54. This brings the left edge of arcuate section 57 into contact with disc 34 and also by means of link 59 moves bell-crank 61 in a counterclockwise direction as shown by the dotted lines in Fig. 2.

At the time pin 26 contacts gear 27 the disc 34 is starting rotating, as above described, in a counterclockwise direction in Fig. 2 to drive the arcuate segment clockwise. As this moves, the member 56 through link 59 moves bell crank 61 also in a clockwise direction from its initial position. If the flow being measured is more than it was during the previous cycle, at some point in its stroke arm 61a will engage pin 48 and move lever 47, against the force of brake 63, in a clockwise direction to move yoke 44 and the pen arm 45. If, however, the flow is less than it was during the previous cycle the pin 26 will leave gear 27 and disc 34 will stop rotating before arm 61a has connected pin 48. The parts will remain in this position until portion 28a of cam 28 moves under pin 57 to turn crosspiece 65 and lever 62 in a clockwise direction, thus moving the braking segment 68 away from pin 49. Since the yoke 44 along with levers 46 and 47 are biased to move in a counterclockwise direction, when the braking force is removed from pin 49, the lever 47 will move under its bias until pin 49 engages arm 61a. This movement changes the setting of the pen on its chart to indicate a smaller value.

If desired the total flow registered by counter 42 may be recorded on the chart by means including a worm wheel 68, driven by worm 49 on shaft 39, that has a ratchet wheel 69 attached thereto. Bearing on the ratchet wheel is one end of a lever 71, the other end of which (not shown) is to be connected to a pen arm for giving a visual indication of the amount of the total flow. As shaft 39 is rotated to actuate the counter it also rotates the ratchet 69 which brings the teeth successively under the end of lever 71 to give its attached pen a zig-zag movement on the chart.

From the above description it will be seen that I have provided an integrator in which the integrating at 100% flow is almost continuous as the only time needed when the mechanism is not integrating is sufficient to free the arm 12 long enough to permit it to assume a new position in case the flow changes. The basis of operation is one of time rather than distance since the integrating is being carried on at a time when the integrating cam is at rest rather than when it is in motion and there is no friction drive since the integration proceeds during the time the free running internal gear 27 is being held stationary.

The power set mechanism for the pen is accurate and is actuated by and from the same mechanism that actuates the integrator and since this is the case the readings can be made to correspond exactly and the usual discrepancies between the two are entirely obviated. In the mechanism of my invention no load at all is placed on the sensitive primary element which is periodically set free to assume any required position, while an auxiliary source of power does all of the work necessary for the integrating and pen setting operations.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a flow meter, a member set in accordance with a condition to be measured, a constantly rotating shaft, a first gear and a cam mounted to rotate with said shaft, a sleeve on said shaft, a second gear on said sleeve and meshing with said first gear, a disc on said sleeve, a third gear rotatable on said shaft and meshing with said second gear, a brake for said third gear and means operated by said cam for applying the brake to the third gear in accordance with the then position of the member to thereby rotate the second gear and disc, an exhibiting member, and means operated by said disc to position the exhibiting member in accordance with rotation of the disc.

2. In a measuring instrument, an exhibiting element, a member positioned in accordance with a condition to be measured, a constantly rotating shaft having a cam and a gear thereon, a lever actuated by the cam in accordance with the position of the member, a second rotatable gear on said shaft, a third gear mounted for movement around said shaft meshing with said previously mentioned gears, said second and third gears being alternately rotatable, connections between the third gear and the exhibiting element for adjusting said exhibiting element as said second gear rotates, and a brake for the second gear controlled by the lever, whereby as the second gear is braked the third gear will move and adjust the exhibiting element.

3. In a measuring instrument an intermittently rotatable disc, a pivoted segment in contact with said disc to be driven thereby, a member positioned in accordance with a condition to be measured, a lever for periodically contacting said member for a period of time depending upon the position thereof, and connections between said lever and disc for causing said disc to rotate when said lever is contacting said member, an exhibiting element, and means connecting the exhibiting element and segment for adjusting the exhibiting element when the disc is rotating.

4. In a measuring instrument, the combination of an element movable to a position in accordance with the value of a condition, a member movable through a path from a first fixed position to a second position determined by engagement with said element, means to move said member comprising a constantly rotating cam, a lever moved around a pivot by said cam, said lever having a portion engaging said member, means to support the pivot of said lever in one of two positions depending upon whether said lever is moving said member or upon whether said member is engaging said element, a brake member movable with said pivot, an exhibiting arm, mechanism operative to periodically move said arm to a position proportional to the value of said condition, and means controlled by said brake member to operate said mechanism.

5. In a measuring instrument, the combination with an element movable to a position proportional to the value of a condition, a member movable through a path from a given first position to a second position determined by engagement with said element, means to periodically move said member toward and from said first position whereby said member will be in said second position for a time determined by the position of said element, a differential including a constantly rotating gear, a normally rotating gear and a normally stationary gear, means operated by said moving means to stop said normally rotating gear and start said normally stationary gear to rotate, means to control said operated means from the position of said member, an exhibiting arm, and means to adjust said arm to a position proportional to the value of the condition by said normally stationary gear as the latter rotates.

6. In a measuring instrument, an intermittently rotatable member, means to rotate said member for a portion of a given period of time depending upon the value of a condition, an oscillating member biased to a predetermined position, said oscillating member having an edge in driven relation with said rotating member to be driven thereby each given period of time from said predetermined position to a position dependent upon the amount said rotatable member rotates, a driven part connected to said oscillating member and moved thereby, a pivoted arm biased into engagement with said driven part and moved by said driven part against its bias, and an exhibiting element mounted for movement with said arm.

7. In a measuring instrument, the combination of a rotatable member, means to rotate said member for a portion of a given period of time depending upon the value of a measurable condition, an exhibiting element, an arm movable therewith, said element and arm being biased for movement in one direction, means to move said arm against its bias to a position proportional to the value of said measurable condition comprising a driving and a driven member, said driving member acting on said arm and said driven member being engaged and driven by said rotatable member, and connecting means to transfer the movement of said driven member to said driving member.

8. In a measuring instrument, the combination of a pivoted exhibiting element biased for movement in one direction, an arm movable through a path with said element, a periodically operated brake acting on said arm to normally prevent said arm from moving, a member movable through said path from a predetermined position to a second position dependent upon the value of a condition, said arm being in the path of movement of said member and being moved thereby against its bias, the arrangement being such that as said member moves from its predetermined position said arm will be moved against its bias if it lies in that portion of the path traversed by said member or will be moved by its bias into engagement with said member when said brake is released, and means periodically operable to move said member from its predetermined position to its position proportional to the value of the condition, said means including a system of gearing having alternately rotatable parts one of which drives said member from its predetermined position to its second position and means responsive to the value of said condition to control the rotation of the other alternately rotatable part.

9. In a measuring instrument, a differential consisting of a first constantly rotating part, a second normally rotatable part and a third normally stationary part, an exhibiting element, means to move said exhibiting element in one direction by a movement of said third part, gravity operating to move said exhibiting element in the opposite direction, brake means to hold said exhibiting element in its adjusted position, a member positioned in accordance with the value of a condition to be measured, means for braking said second normally rotatable part in accordance with the position of said member, said means thereby causing movement of the third normally stationary part to adjust the position of the exhibiting element in said one direction against the action of said brake means, and means to periodically remove the said brake means from said exhibiting element so that it may be positioned in said opposite direction by gravity.

10. In a flow meter having a counter and an exhibiting element, the combination of a rotatable sleeve, means to rotate said sleeve including a member positioned in accordance with the value of a condition to be measured, a constantly rotating shaft having a cam and a gear thereon, a lever periodically moved by said cam from a first fixed position to a variable second position depending upon the value of said condition, a second gear rotatable on said shaft, a third gear mounted for movement around said shaft and meshing with said two first mentioned gears, said second and third gears being alternately rotatable, means to connect said sleeve to said third gear whereby rotation of said third gear rotates said sleeve, brake means for said second gear, and means operated by said lever to apply said brake means to said member whereby as the second gear is braked the third gear will rotate and rotate said sleeve, and a connection between said sleeve and the counter and exhibiting element.

11. In a flow meter having a counter and an exhibiting element, the combination of an element movable to a position in accordance with the value of a condition, a member movable through a path from a first fixed position to a second position determined by engagement with said element, means to move said member comprising a constantly rotating cam and a lever moved around a pivot by said cam, said lever having a portion engaging said member to move the same through its path, means to support the pivot of said lever in one of two positions depending upon whether said lever is moving said member or whether said member is engaging said element, a rotatable part, drive means for said part, a brake to control said drive means, said brake being mounted on said means to support said pivot and in a position to start said drive means when said pivot is in one position and being in a position to stop said drive means when said pivot is in its second position, and a connection between said part and the counter and exhibiting element.

COLEMAN B. MOORE.